United States Patent
Huang et al.

(10) Patent No.: US 8,243,990 B2
(45) Date of Patent: Aug. 14, 2012

(54) METHOD FOR TRACKING MOVING OBJECT

(75) Inventors: Chung-Hsien Huang, Tainan (TW); Ming-Yu Shih, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 827 days.

(21) Appl. No.: 12/346,845

(22) Filed: Dec. 31, 2008

(65) Prior Publication Data

US 2010/0124358 A1 May 20, 2010

(30) Foreign Application Priority Data

Nov. 17, 2008 (TW) ................................ 97144397 A (51) Int. Cl.
*G06K 9/00* (2006.01)
(52) U.S. Cl. .................. 382/103; 382/100; 382/181
(58) Field of Classification Search .................. 382/100, 382/103, 107, 118, 115, 282, 286, 291
See application file for complete search history.

(56) References Cited

U.S. PATENT DOCUMENTS

| | | | |
|---|---|---|---|
| 5,969,755 A * | 10/1999 | Courtney ...................... | 348/143 |
| 6,295,367 B1 * | 9/2001 | Crabtree et al. ............. | 382/103 |
| 6,628,835 B1 * | 9/2003 | Brill et al. ...................... | 382/226 |
| 6,882,959 B2 * | 4/2005 | Rui et al. ....................... | 702/179 |
| 6,931,146 B2 * | 8/2005 | Aoki et al. ..................... | 382/107 |
| 7,023,469 B1 * | 4/2006 | Olson ........................... | 348/152 |
| 7,072,494 B2 * | 7/2006 | Georgescu et al. ........... | 382/103 |
| 7,088,846 B2 * | 8/2006 | Han et al. ...................... | 382/103 |
| 7,149,356 B2 * | 12/2006 | Clark et al. .................... | 382/209 |
| 7,231,064 B2 * | 6/2007 | Rui et al. ....................... | 382/103 |
| 7,394,916 B2 * | 7/2008 | Brodsky et al. ............... | 382/103 |
| 7,801,328 B2 * | 9/2010 | Au et al. ........................ | 382/103 |
| 2001/0004400 A1 | 6/2001 | Aoki et al. | |
| 2005/0012817 A1 | 1/2005 | Hampapur et al. | |
| 2005/0104727 A1 | 5/2005 | Han et al. | |
| 2005/0249080 A1 * | 11/2005 | Foote et al. ................... | 369/59.1 |
| 2008/0232685 A1 | 9/2008 | Brown | |

* cited by examiner

*Primary Examiner* — Chan S Park
*Assistant Examiner* — Avinash J Yentrapati
(74) *Attorney, Agent, or Firm* — Jianq Chyun IP Office (57) ABSTRACT

A method for tracking a moving object is provided. The method detects the moving object in a plurality of continuous images so as to obtain space information of the moving object in each of the images. In addition, appearance features of the moving object in each of the images are captured to build an appearance model. Finally, the space information and the appearance model are combined to track a moving path of the moving object in the images. Accordingly, the present invention is able to keep tracking the moving object even if the moving object leaves the monitoring frame and returns again, so as to assist the supervisor in finding abnormal acts and making following reactions.

18 Claims, 5 Drawing Sheets

METHOD FOR TRACKING MOVING OBJECT

CROSS-REFERENCE TO RELATED APPLICATION

This application claims the priority benefit of Taiwan application serial no. 97144397, filed on Nov. 17, 2008. The entirety of the above-mentioned patent application is hereby incorporated by reference herein and made a part of this specification.

BACKGROUND OF THE INVENTION

1. Field of the Invention

The present invention relates to an image processing method. More particularly, the present invention relates to a method for tracking a moving object.

2. Description of Related Art

Visual monitoring technology becomes more important in recent years, especially after the 911 event, more and more monitoring cameras are allocated at various places. However, a conventional surveillance is generally carried out by human monitoring, or monitoring data is just stored in a storage device for later reference. As more and more cameras are allocated, the required human labour is increased accordingly, so that an automatic monitoring system applying a computer visual technique plays an important role in recent years.

The visual monitoring system analyses behaviours (such as a moving track, a pose or other features) of a moving object in a monitoring frame to detect occurrence of an abnormal event, so as to effectively notify securities for handling. A plurality of basic issues of the visual monitoring, such as background subtraction, moving object detecting and tracking, shadow removing, etc. have been studied and researched in the past. Recently, the study and research are focused on detection of high-class events, such as behaviour analysis, remnants detection, wander detection or congestion detection, etc. For a current strong demand of monitoring market, automatic and intelligent behaviour analysis may have a great demand and business opportunities.

The so-called wander detection refers that one or a plurality of moving objects is continually and repeatedly appeared in a certain monitoring region within a specific period of time. For example, prostitutes or beggars may wander about street corners, graffiti writers may stay around walls, person having intent to commit suicide may wander about a platform or drug dealers may wander about a subway station to wait their clients, etc.

However, since a camera vision of the visual monitoring system is limited, which cannot totally cover a moving path of a wanderer, when the wanderer leaves the monitoring region, the visual monitoring system then loses the monitoring object, and cannot continue the detection, especially when the wanderer returns again. Therefore, how to re-identify the wanderer to associate his former behaviour is a bottleneck for the current wander detection technique.

SUMMARY OF THE INVENTION

Accordingly, the present invention is relates to a method for tracking a moving object, by which space information and appearance model of the moving object in a plurality of images are combined to continually track a moving path of the moving object in the images.

The present invention provides a method for tracking a moving object. The moving object in a plurality of continuous images is detected, so as to obtain space information of the moving object in each of the images. An appearance feature of the moving object in each of the images is captured to build an appearance model of the moving object. The space information and the appearance model are combined to track a moving path of the moving object in the images.

In an embodiment of the present invention, the step of detecting the moving object in a plurality of continuous images further includes judging whether the moving object is a tracking object, and removing the moving objects not belonged to the tracking object. Wherein, a method of judging whether the moving object is the tracking object includes judging whether an area of a rectangular region is greater than a first predetermined value, and if the area is greater than the first predetermined value, the moving object encircled by the rectangular region is judged to be the tracking object. Another method is to judge whether an aspect ratio of the rectangular region is greater than a second predetermined value, and if the aspect ratio is greater than the second predetermined value, the moving object encircled by the rectangular region is judged to be the tracking object.

In an embodiment of the present invention, the steps of capturing the appearance features of the moving object in each of the images to build the appearance model of the moving object are as follows. The rectangular region is divided into a plurality of blocks. A color distribution of each of the blocks is captured. A median of the color distribution is obtained from each of the blocks according to a recursive method to build a binary tree for describing the color distribution. The color distributions of branches of the binary tree are selected to serve as a feature vector of the appearance model of the moving object.

In an embodiment of the present invention, the step of dividing the rectangular region into the blocks includes dividing the rectangular region into a head block, a body block and a lower limb block according to a certain proportion, and the step of capturing the color distribution of each of the blocks includes neglecting the color distribution of the head block. Wherein, the color distribution includes a color feature in a RGB color space or in a hue, saturation, illumination (HSI) color space.

In an embodiment of the present invention, after the step of detecting the moving object in a plurality of continuous images to obtain the space information of the moving object in each of the images, the method further includes tracking the moving path of the moving object according to the space information, and accumulating a elapsed time of the moving object staying in the images.

In an embodiment of the present invention, after the step of accumulating the elapsed time of the moving object staying in the images, the method further includes judging whether the elapsed time of the moving object staying in the images is greater than a first predetermined time, wherein if the elapsed time is greater than the first predetermined time, the appearance features of the moving object are captured to built the appearance model of the moving object, and the space information and the appearance model of the moving object are combined to track the moving path of the moving object in the images.

In an embodiment of the present invention, the steps of combining the space information and the appearance model of the moving object to track the moving path of the moving object in the images are as follows. A spatial related prior probability of the corresponding moving object in two adjacent images is calculated according to the space information, and a similarity of the corresponding moving object in the two adjacent images is calculated according to the appearance information. The prior probability and the similarity are combined to a Bayesian tracker to judge the moving path of the moving object in the adjacent images.

In an embodiment of the present invention, when the elapsed time is greater than the first predetermined time, the method further includes recording the elapsed time and the appearance model of the moving object into a database, which includes associating the appearance model of the moving object to a plurality of appearance models within the database to judge whether the appearance model of the moving object is recorded in the database. Wherein, if the appearance model of the moving object is already recorded in the database, only the elapsed time of the moving object is recorded into the database; conversely, if the appearance model of the moving object is not recorded in the database, the elapsed time and the appearance model of the moving object are recorded into the database.

In an embodiment of the present invention, the steps of associating the appearance model of the moving object to the appearance models within the database include calculating a first distance between the appearance models built at two different time points based on the same moving object, so as to build a first distance distribution, and calculating a second distance between the appearance models of two moving objects in the images, so as to build a second distance distribution, and then obtaining a boundary of the first distance distribution and the second distance distribution to serve as a standard for distinguishing the appearance model.

In an embodiment of the present invention, after the step of recording the elapsed time and the appearance model of the moving object into the database, the method further includes analysing a time sequence of the moving object in the database to determine whether the moving object is accorded to a wander event. A determining method thereof includes judging whether a time for the moving object continuously appearing in the images is greater than a second predetermined time, wherein if the time for the moving object continuously appearing in the images is greater than the second predetermined time, the moving object is judged to be accorded to the wander event. Another method is to judge whether a time interval for the moving object leaving the images is less than a third predetermined time, wherein when the time interval for the moving object leaving the images is less than the third predetermined time, the moving object is judged to be accorded to the wander event.

In the present invention, by building an appearance model of a visitor, and by combining a Bayesian tracking technique, a database management technique and an adaptive threshold learning technique, the moving object entering a monitoring frame is continuously tracked, so that a problem that when the moving object leaves the monitoring frame and returns again, the moving object cannot be continuously detected can be resolved. Moreover, the wander event of the visitor can be automatically detected according to a time condition that the visitor appears in the monitoring frame.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides an unsupervised wander detection technique, by which a system can automatically learn specific parameters according to events of a monitoring area, so as to build an appearance model for a visitor entering the monitoring area, and associate the appearance model to a visitor database for analysis. Wherein, by comparing the appearance model to historical records, the system can keep tracking the visitor even if the visitor leaves the monitoring area and returns again. Finally, according to a predefined wandering rule, a wander event can be further detected. To fully convey the spirit of the present invention, embodiments are provided to describe the present invention in detail.

Figure 1:
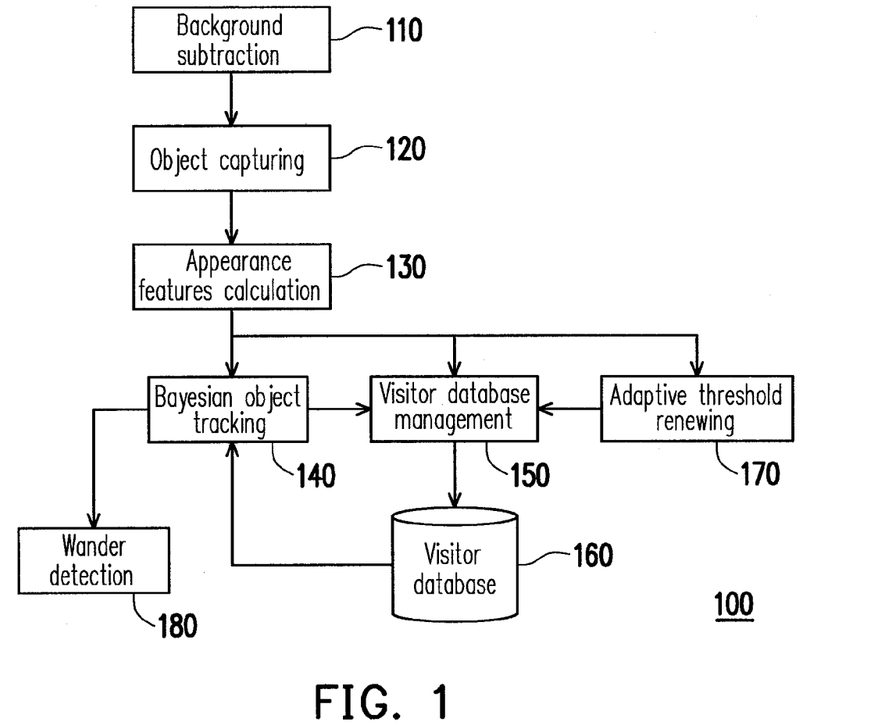
FIG. 1 is a schematic diagram illustrating a moving object tracking system according to an embodiment of the present invention.

FIG. 1 is a schematic diagram illustrating a moving object tracking system according to an embodiment of the present invention. Referring to FIG. 1, the tracking system 100 of the present invention detects the moving object in a plurality of continuous images based on a background subtraction 110. Since a tracking object is a moving object having an integral appearance (for example, a pedestrian), objects that are not belonged to the tracking object are removed according to a simple condition setting, which is referred to as moving object capturing 120.

On the other hand, for each of the captured moving objects, an appearance feature calculation 130 is first performed. Then, a moving object tracking 140 is continuously performed by a tracker based on the Bayesian decision, and an appearance model of the moving object is built based on the appearance features of the same moving object obtained from a plurality of the images. Meanwhile, the tracking system 100 maintains a visitor database 150 in a memory. Wherein, visitor database management 160 is performed to compare and associate the appearance features of the current captured moving object to the appearance models in the visitor database 150 according to a result of an adaptive threshold renewing 170. If the moving object can be associated to a certain object within the visitor database 150, it represents that the moving object has ever been to the scene before; conversely, the moving object is added to the visitor database 150. Finally, a wander event detection 180 can be performed according to a time condition that the visitor appears in the area. When the moving object is tracked, the tracking system 100 takes a distribution status of the moving object in the frame as a sample to automatically learn how to distinguish differences among different visitors, so as to correctly associate the appearance models. Next, a detailed flow of a method for tracking the moving object according to an embodiment of the present invention is provided.

Figure 2:
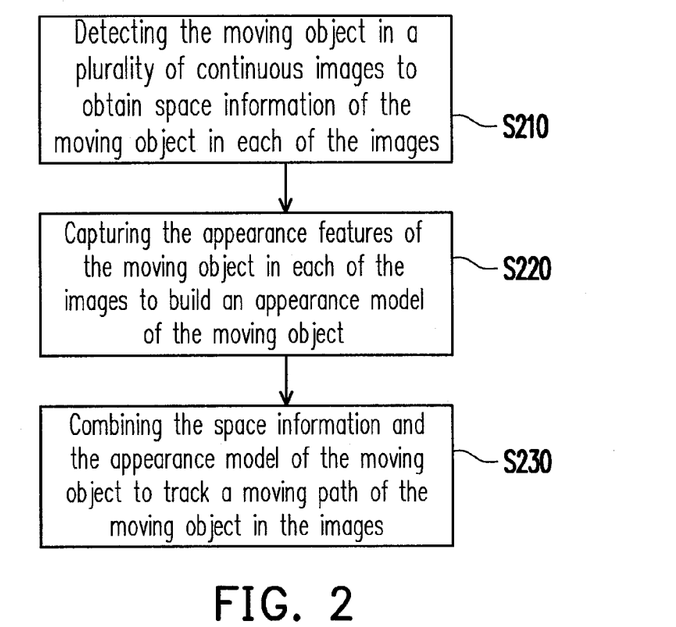
FIG. 2 is a flowchart illustrating a method for tracking a moving object according to an embodiment of the present invention.

FIG. 2 is a flowchart illustrating a method for tracking a moving object according to an embodiment of the present invention. Referring to FIG. 2, in the present embodiment, the moving object entering the monitoring area is tracked to build the appearance model thereof, and the appearance model is compared to data stored in a visitor database of a system memory to determine whether the moving object has ever appeared, so as to continuously track the moving object. Detailed description of the method is as follows.

First, the moving object in a plurality of continuous images is detected to obtain space information of the moving object in each of the images (step S210). According to such moving object detection technique, a background image is first built, and a foreground is obtained by subtracting the background image from a current image. Each of connection regions of the foreground obtained by subtracting the background image from the current image is marked according to a connected component labeling method, and is recorded by a minimum rectangular region $b=\{r_{left}, r_{top}, r_{right}, r_{bottom}\}$ capable of encircling the connection region, wherein $r_{left}, r_{top}, r_{right}$ and $r_{bottom}$ respectively represent a left, a top, a right and a bottom boundary of the rectangular region.

It should be noted that since there are plenty of factors that can form the foreground, and the object of interest is a foreground object containing a single moving object, a pedestrian is taken as an example in the present invention, and whether the moving object is the pedestrian is further judged, and the moving object not belonged to the pedestrian is filtered, wherein the filtering is performed based on two following conditions. A first condition is to judge whether an area of the rectangular region is greater than a first predetermined value, and if the area is greater than the first determined value, the moving object encircled by the rectangular region is judged to be the pedestrian, by which noises and fragments can be filtered. A second condition is to judge whether an aspect ratio of the rectangular region is greater than a second predetermined value, and if the aspect ratio of the rectangular region is greater than the second predetermined value, the moving object encircled by the rectangular region is judged to be the pedestrian, by which blocks containing overlapped figures or large range noises can be filtered.

Next, the appearance features of the moving object in each of the images are captured to build an appearance model of the moving object (step S220). In detail, the present invention provides a novel appearance description method, by which a meaningful appearance feature is obtained according to a color structure and a relatively loose body division. The so-called relatively loose body division means that the rectangular region encircling the pedestrian is divided into a plurality of blocks, and a color distribution of each of the blocks is captured. For example, the rectangular region can be divided into a head block, a body block and a lower limb block according to a proportion of 2:4:4 for corresponding to the head, the body and the lower limb of the pedestrian. Wherein, since a color feature of the head is liable to be influenced by a facing direction thereof, and a discrimination thereof is not significant, information of the head block can be neglected.

Figure 3:
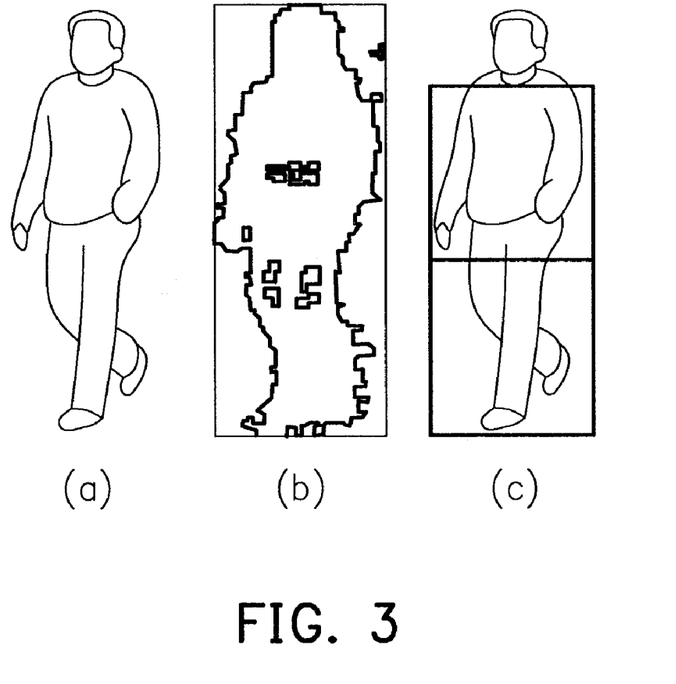
FIGS. 3(a), 3(b) and 3(c) are schematic diagrams illustrating appearance models of a moving object according to an embodiment of the present invention.

For example, FIGS. 3(a), 3(b) and 3(c) are schematic diagrams of appearance models of a moving object according to an embodiment of the present invention. Wherein, FIG. 3(a) illustrates an image of pedestrian, which is a rectangular region filtered based on the above two conditions, and is referred to as a pedestrian candidate P, FIG. 3(b) illustrates a corresponding connection object. After the connection object is labeled, a median of the color distribution is respectively obtained from the body block and the lower limb lock of FIG. 3(c) according to a recursive method to build a binary tree for describing the color distribution.

Figure 4:
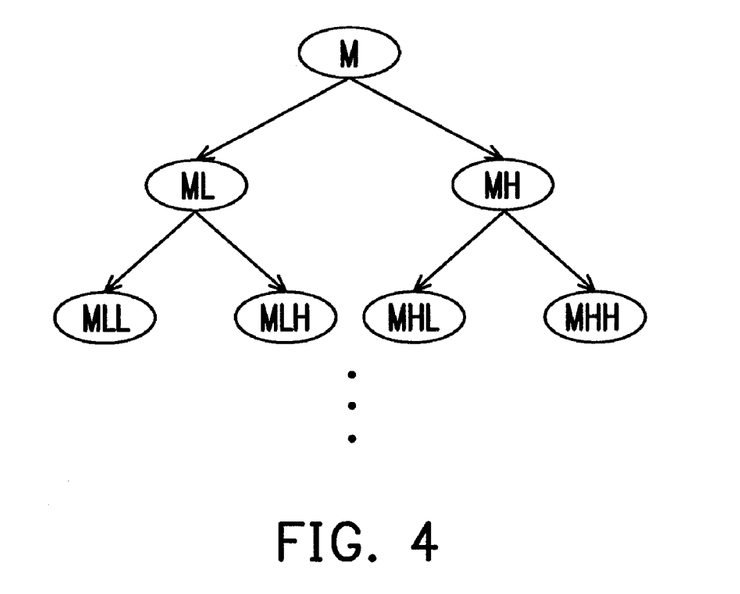
FIG. 4 is a schematic diagram illustrating a binary tree of a color distribution according to an embodiment of the present invention.

FIG. 4 is a schematic diagram illustrating a binary tree of a color distribution according to an embodiment of the present invention. Referring to FIG. 4, M represents the median of a certain color distribution of the body block or the lower limb block, and ML and MH are medians of respective color distributions divided from M. Deduced by analogy, branches MLL, MLH, MHL and MHH are obtained. Wherein, the color distribution can be the color feature of one of a RGB color space, a HSI color space, or other color spaces, which is not limited by the present invention. For simplicity's sake, the RGB color space is taken as an example in the present invention to build a binary tree containing three layers of the color distribution, by which a feature vector $f=[R_{MLL}^{body}, G_{MLL}^{body}, B_{MLL}^{body}, R_{MLH}^{body}, \ldots, R_{MHH}^{legs}, G_{MHH}^{legs}, B_{MHH}^{legs}]$ with 24 dimensions is formed to describe the appearance feature of the pedestrian. After the feature vector is obtained, each of the pedestrian candidates is then represented by the space information and appearance model in the image.

After the space information and the appearance model of the moving object are obtained, the two information are further combined to track a moving path of the moving object in the images (step S230). In the present embodiment, tracking of the moving object is achieved according to a moving object tracking method based on the Bayesian decision. According to such tracking method, the appearances and positions of the moving object in two adjacent images are considered, and are perfectly associated according to the Bayesian decision, which is referred to as the tracking of the moving object.

In detail, assuming at a time point t, a list containing n pedestrian candidate rectangles obtained based on object detecting and appearance model building is represented by $C=\{P_j^t | j=1, 2, \ldots, n\}$, and a historic record tracked by a Bayesian tracker before a time point t−1 is a list $M=\{H_i^t | i=1, 2, \ldots, m\}$ that contains m visitor hypotheses. The so-called visitor hypotheses refer to the associated τ continuous pedestrian candidate images $H=\{P^{t-\tau}, P^{t-\tau+1}, \ldots, P^t, \rho\}$ under continuous tracking, wherein $P^{t-\tau}$ is a first appeared pedestrian candidate rectangle of the visitor, and others can be deduced by analogy. Moreover, ρ represents a confidence index, which is increased or decreased corresponding to success or failure of the object tracking, and when the confidence index is greater than an upper threshold, the visitor hypothesis is considered to have enough confidence index, and is converted to a physical visitor; conversely, if the confidence index is less than zero, the moving object is regarded to have left the monitoring scene, and now the visitor hypothesis can be removed from the list M maintained by the Bayesian tracker. The above Bayesian object tracking includes three stages of learning, associating and renewing. In the following content, another embodiment is provided for detailed description.

Figure 5:
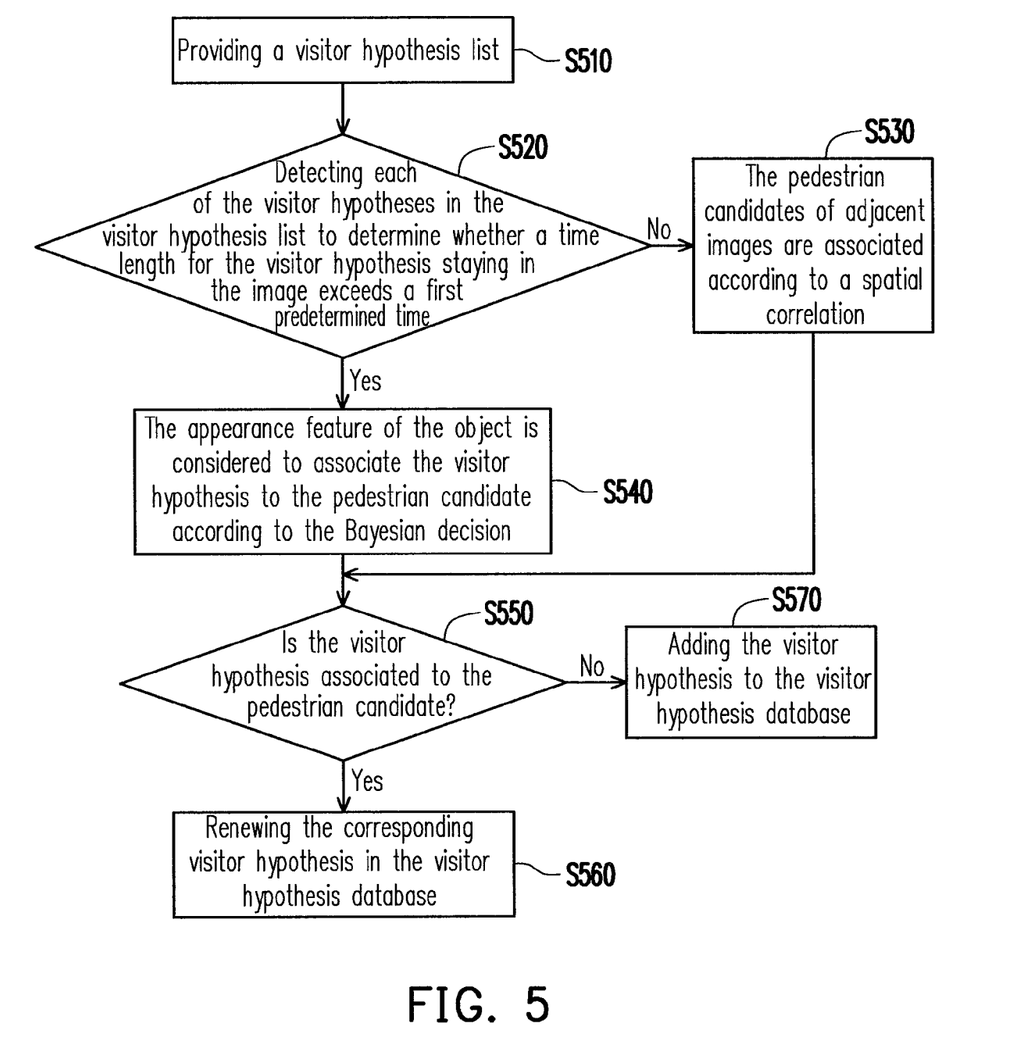
FIG. 5 is a flowchart illustrating a Bayesian object tracking method according to an embodiment of the present invention.

FIG. 5 is a flowchart illustrating a Bayesian object tracking method according to an embodiment of the present invention. Referring to FIG. 5, in the learning stage, a set of visitor hypothesis list M is first provided (step S510), wherein the visitor hypothesis list M includes a plurality of the visitor hypotheses that has been continuously tracked and associated.

Next, for each of the visitor hypotheses $H_i^{t-1}$ in the visitor hypothesis list M, whether a time length for the visitor hypothesis staying in the image (time for being tracked) exceeds a first predetermined time $L_1$ (step S520) is detected, and if the time length is less than the first predetermined time $L_1$, the tracking is still in the learning stage, and now the pedestrian candidates of the adjacent images are associated only according to a spatial correlation (step S530). For example, if the rectangular region $b_i^{t-1}$ belonged to the visitor hypothesis $H_i^{t-1}$ is spatially overlapped to the rectangular region $b_j^t$ of the pedestrian candidate $P_j^t$ of the current image, the visitor hypothesis $H_i^{t-1}$ is renewed to $H_i^t$ by adding the pedestrian candidate $P_j^t$.

Next, in the associating stage, i.e. the time length of the visitor hypothesis $H_i^{t-1}$ is greater than the first predetermined time $L_1$, it represents the visitor hypothesis is stably tracked, and now not only the spatial correlation is considered, but also the appearance feature of the object is considered to associate the visitor hypothesis to the pedestrian candidate according to the Bayesian decision (step S540). In detail, such step includes calculating a spatial related prior probability of the corresponding moving object in two adjacent images according to the above space information, calculating a likelihood of the corresponding moving object in the two adjacent images according to the appearance information, and then combining the prior probability and the likelihood to the Bayesian tracker to judge whether the visitor hypothesis is associated to the pedestrian candidate. For example, an equation (1) is a discriminate function of the Bayesian decision:

$$BD(H_i^{t-1}, P_j^t) = P(C_H | P_j^t) / P(\overline{C_H} | P_j^t) \quad (1)$$
$$= (p(C_H) p(P_j^t | C_H)) / p(p(\overline{C_H}) p(P_j^t | (\overline{C_H}))$$

Wherein, the likelihood function $P(C_H | P_j^t)$ represents the probability of the pedestrian candidate $P_j^t$ belonging to the visitor hypothesis $H_i^{t-1}$; the function $P(\overline{C_H} | P_j^t)$ is on the contrary, i.e. represents the probability of pedestrian candidate $P_j^t$ not belonging to the visitor hypothesis $H_i^{t-1}$. Therefore, if BD is greater than 1, it represents that the decision is biased in favor that the pedestrian candidate $P_j^t$ is belonged to the visitor hypothesis $H_i^{t-1}$, and therefore the hypothesis and the pedestrian candidate are associated. Wherein, if the similarity function $p(P_j^t | C_H)$ in the equation (1) is modeled by a multi-dimensional normal distribution $N(\mu, \Sigma^2)$ an equation (2) is obtained:

$$p(P_j^t | C_H) = \frac{1}{\sqrt{\det \Sigma (2\pi^d)}} \exp\left(-\frac{1}{2}(f_j^t - \mu)^T \sum\nolimits^{-1} (f_j^t - \mu)\right) \quad (2)$$

Wherein, $\mu$ and $\Sigma$ are respectively a mean and a covariance matrix of former $L_1$ feature values (from $f_i^{t-L_1}$ to $f_i^{t-1}$), and calculation methods thereof are as follows:

$$\mu = \sum_{k=t-L_1}^{t-1} \frac{f^k}{L_1} \quad (3)$$

$$\Sigma = \begin{pmatrix} \sigma_{11} & \sigma_{21} & \cdots & \sigma_{d1} \\ \sigma_{12} & \sigma_{22} & \cdots & \sigma_{d2} \\ \vdots & \vdots & \ddots & \vdots \\ \sigma_{1d} & \sigma_{21} & \cdots & \sigma_{dd} \end{pmatrix} \quad (4)$$

Wherein, $$\sigma_{xy} = (f_x - \mu_x)(f_y - \mu_y) \quad (5)$$

The likelihood function $p(P_j^t | \overline{C_H})$ is represented by a uniform distribution function. On the other hand, since the prior probabilities $p(C_H)$ and $p(\overline{C_H})$ are used for reflecting a prior recognition of occurrence of the event, the prior knowledge is corresponded to the spatial correlation. In other words, the closer a distance between the rectangular regions $b_i^{t-1}$ and $b_j^t$ is, the greater the prior probability is given. Here, an exponential function related to the distance can be used for representing the prior probabilities $p(C_H)$ and $p(\overline{C_H})$, which are shown respectively as equations (6) and (7):

$$p(C_H) = \exp\left(-\frac{D(b_j^t, b_i^{t-1})}{\sigma_D^2}\right) \quad (6)$$

$$p(\overline{C_H}) = 1 - p(C_H) \quad (7)$$

Wherein, $\sigma_D$ is a parameter controlled by a user, which can be adjusted according to a moving speed of the moving object in the image. Whether the visitor hypothesis is associated to the pedestrian candidate is judged according to the above spatial correlation and the appearance feature (step S550). In the renewing stage, if the pedestrian candidate $P_j^t$ is judged to be associated to the visitor hypothesis $H_i^{t-1}$, the pedestrian candidate $P_j^t$ is added to the visitor hypothesis $H_i^{t-1}$ to renew the visitor hypothesis into $H_i^t = \{P_i^1, P_i^2, \ldots, P_i^{t-1}, P_j^t, \rho_i\}$ (step S560). Meanwhile, a constant $\Delta\rho$ can also be added to improve the confidence index $\rho_i$ of the hypothesis until the confidence index $\rho_i$ reaches a predetermined maximum value $\rho_{max}$; conversely, if the visitor hypothesis $H_i^{t-1}$ cannot be associated to any of the pedestrian candidate $P_j^t$ in the frame, the constant $\Delta\rho$ is subtracted from the confidence index $\rho_i$, and when a value of the confidence index $\rho_i$ is less than zero, such visitor hypothesis is removed from the visitor hypothesis list M, which represents that the visitor has left the monitoring frame. On the other hand, if a pedestrian candidate in the frame t cannot be associated to any of the visitor hypothesis, it represents that the pedestrian candidate is a new-entering visitor, so that a new visitor hypothesis $H_{m+1}^t = \{P^t\}$ is added to the visitor hypothesis list M (Step S570), and $\rho_{m+1} = 0$ is given. In the present embodiment, the maximum value $\rho_{max}$ is set to 1 and the constant $\Delta\rho$ is set to 0.1, though the present invention is not limited thereto.

To identify the appearance of the visitor entering and leaving the scene to facilitate analysing a behaviour and a time point of a same pedestrian entering and leaving the scene, the present invention provides a visitor database to record the appearance model and the visit time of the visitor. Management of the visitor database is shown as a flowchart of FIG. 6, and detailed description thereof is as follows.

Figure 6:
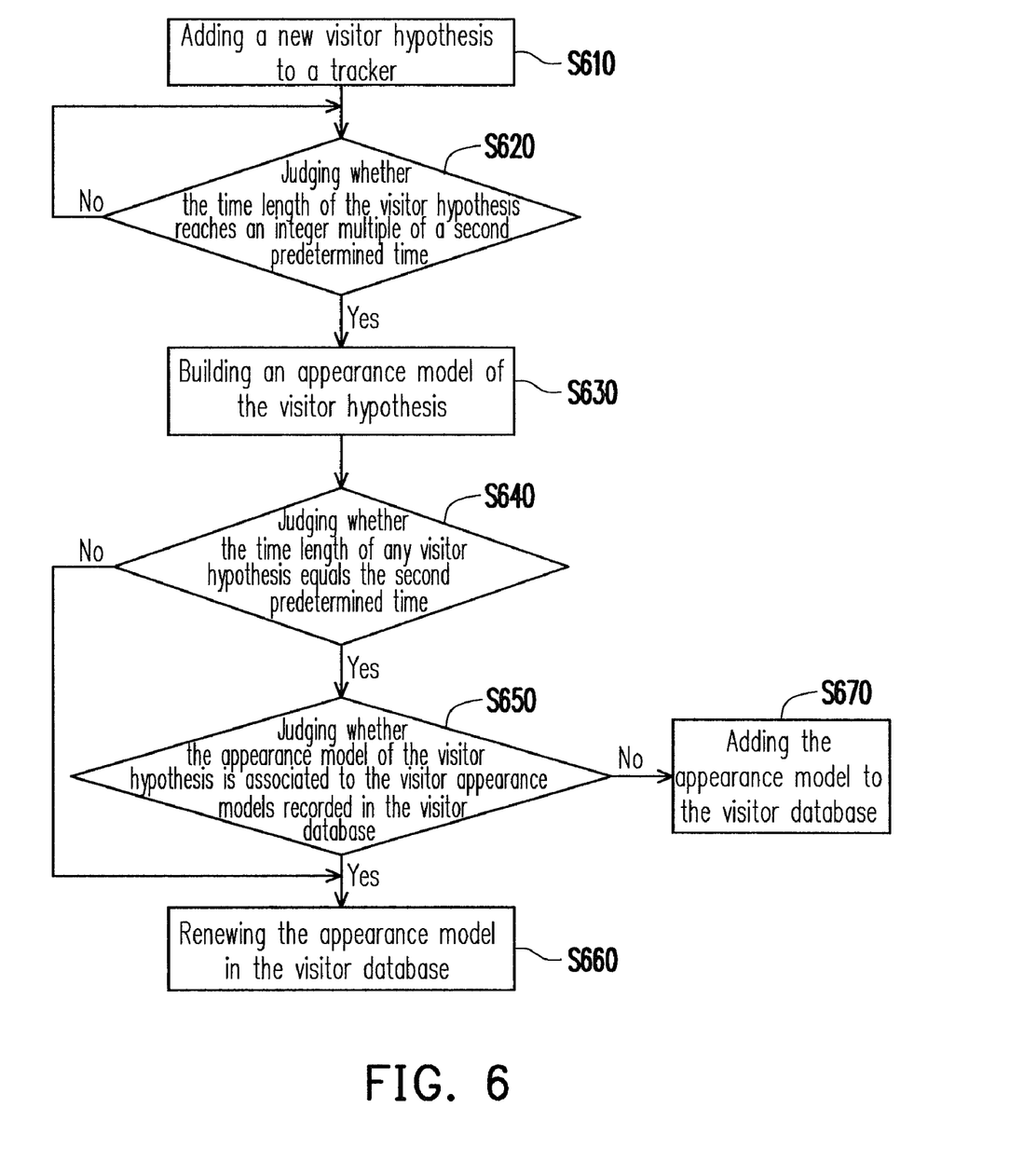
FIG. 6 is a flowchart illustrating a method for managing a visitor database according to an embodiment of the present invention.

First, a new visitor hypothesis is added to the tracker (step S610), and whether the time length of the visitor hypothesis reaches an integer multiple of a second predetermined time $L_2$ is judged (step S620), and if yes, a mean feature vector and a covariance matrix thereof are calculated according to $L_2$ former appearance features, so as to describe a current appearance model V={N(μ,Σ),{s}} by the Gaussian function (step S630), wherein {s} is a constant sequence recording a building time of the appearance model. Next, whether the time length of any visitor hypothesis equals the second predetermined time $L_2$ is judged (step S640) and whether the appearance model thereof is associated to the visitor appearance models recorded in the visitor database is also judged (step S650). Wherein, if the visitor is similar to one or more visitor appearance models recorded in the visitor database (a distance therebetween is less than a threshold T), it represents that the visitor has ever visit the scene, and now the appearance model of the visitor is associated to a most similar appearance model $V_k$, and the visitor appearance model $\tilde{V}_k$ in the visitor database is renewed according to equations (8) and (9) (step S660):

$$\tilde{V}_k = \{N(\tilde{\mu}_k, \tilde{\Sigma}_k), \{s_k^1, s_k^2, \ldots, s_k^u, s_i^1, s_i^2, \ldots, s_i^v\}\} \quad (8)$$

$$\tilde{\mu}_k = \frac{u \cdot \mu_k + v \cdot \mu_i}{u + v} \quad (9)$$

$$\tilde{\sigma}_k^2(x, y) = \frac{u \cdot \sigma_k^2(x, y) + v \cdot \sigma_i^2(x, y)}{u + v} \quad (10)$$

Wherein, $\rho^2(x,y)$ represents elements (x,y) in the covariance matrix Σ, u and v are time sequence lengths of two appearance models, and served as weights for renewing. Since now $V_i$ is a newly build appearance model, the v value thereof is 1. Conversely, if the new appearance model $V_i$ cannot be associated to any appearance model within the visitor database, it represents that the visitor is a newly observed visitor, and now the appearance model and the time mark thereof can be added to the visitor database (step S670). Now, a distance of the two appearance models (which are respectively a d-dimensional Gaussian distribution, $N_1(\mu_1,\Sigma_1)$ and $N_2(\mu_2,\Sigma_2)$) is calculated according to the following equations:

$$D(V(N_1), V(N_2)) = (D_{KL}(N_1\|N_2) + D_{KL}(N_2\|N_1))/2 \quad (11)$$

Wherein, $$D_{KL}(N_1\|N_2) = \frac{1}{2}\left( \ln\left(\frac{\det\Sigma_2}{\det\Sigma_1}\right) + tr(\Sigma_2^{-1}\Sigma_1) + (\mu_2 - \mu_1)^T \Sigma_2^{-1}(\mu_2 - \mu_1) - d \right) \quad (12)$$

It should be noted that if the time length of the visitor hypothesis is more than twice of the second predetermined time $L_2$, it represents that the visitor hypothesis has been associated to the visitor database, and now the corresponding appearance model in the visitor database can be continually renewed according to the equation (8).

Regarding the above threshold T used for judging the association of the two appearance models, if the distance between the two appearance models is greater than the threshold T, it can be judged that the two appearance models respectively correspond to two different visitors; conversely, if the distance between the two appearance models is less than the threshold T, it can be judged that the two appearance models are associated, and accordingly it can be judged that the two appearance models correspond to the same visitor.

Figure 7:
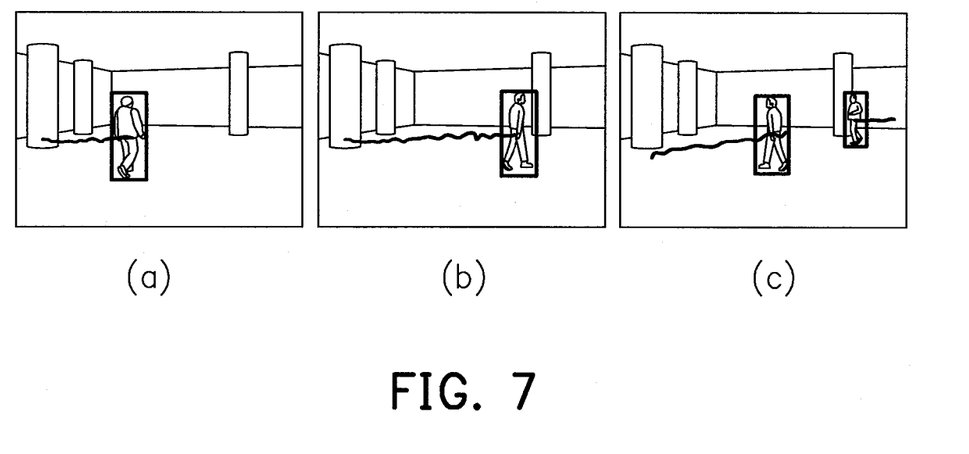
FIGS. 7(a), 7(b) and 7(c) are schematic diagrams illustrating a method for renewing an adaptive threshold according to an embodiment of the present invention.

To calculate a most suitable threshold T, the present invention provides a unsupervised learning method, by which the system can automatically perform the learning and renewing according to the images, so as to obtain an optimal appearance distinguishing ability. According to the method, two events A and B are considered. The event A represents that a same visitor is stably and continually tracked. As shown in FIG. 7(a) and FIG. 7(b), when the visitor is stably tracked by the system for the time length of $2L_2$, it has enough confidence to believe that the two appearance models $V_1'$=AM($P^t$, $P^{t-1}$, ..., $P^{t-L_2+1}$) and $V_1$=AM($P^{t-L}$, $P^{t-L_2-1}$, ..., $P^{t-2L_2+1}$) are come from the same visitor, and now the distance $D(V_1',V_1)$ between the two appearance models can be calculated to serve as a feature value of the event A. The event B represents that two visitors are simultaneously appeared in the monitoring frame and are both stably tracked. As shown in FIG. 7(c), since the two visitors are simultaneously appeared in the same monitoring frame, it has enough confidence to believe that the two appearance models are come from different visitors, and now the distance $D(V_2,V_3)$ between the two appearance models can be calculated to serve as a feature value of the event B.

Figure 8:
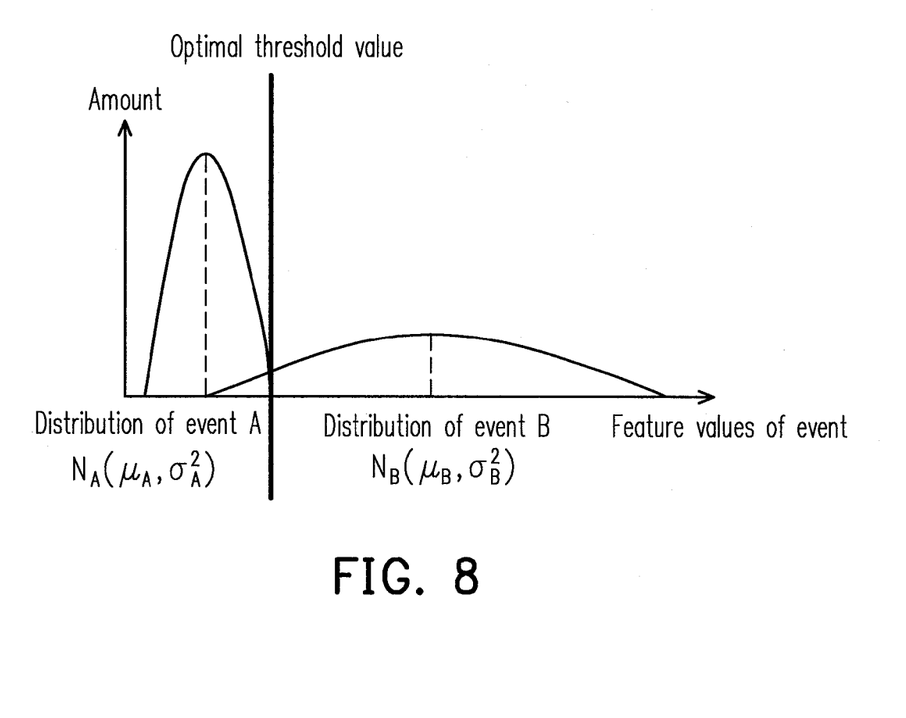
FIG. 8 is a diagram illustrating calculation of an adaptive threshold according to an embodiment of the present invention.

When an amount of the event A or the event B collected by the system reaches a certain amount, a statistic analysis thereof is performed. As shown in FIG. 8, since the feature value of the event A is obtained by calculating the distances between the two appearance models built at two different time points according to the same visitor, the feature value of the event A is closed to a zero point and has a relatively concentrated distribution. The feature value of the event B is obtained by calculating the distance between the two appearance models of two different objects, so that the feature value of the event B is relatively far away from the zero point and has a relatively loose distribution. By respectively calculating a mean and a standard deviation of the two events, and representing distance data thereof by the normal distributions $N_A(\mu_A,\sigma_A^2)$ and $N_B(\mu_B,\sigma_B^2)$, a first distance distribution and a second distance distribution can be built. Now, an optimal boundary of the first distance distribution and the second distance distribution can be obtained according to an equation (13) to serve as the threshold T for distinguishing the appearance models:

$$\frac{1}{\sigma_A\sqrt{2\pi}}e^{-\frac{1}{2}\left(\frac{\mu_A-T}{\sigma_A}\right)^2} = \frac{1}{\sigma_B\sqrt{2\pi}}e^{-\frac{1}{2}\left(\frac{\mu_B-T}{\sigma_B}\right)^2} \quad (13)$$

Finally, the appearance models and the elapsed time of the visitors recorded in the above visitor database are further applied to a wander detection, by which only the time sequence {s} recorded corresponding to the appearance model of each of the visitors in the visitor database is required to be analysed. Here, the wander detection is performed according to the conditions of the following equations (14) and (15):

$$s_t - s_1 > \alpha \quad (14)$$

$$s_i - s_{i-1} < \beta, 1 < i \leq t \quad (15)$$

Wherein, the equation (14) represents that a time for the visitor staying in the frame from a first appearance to a current detection is greater than a predetermined time α, and the equation (15) represents that a time interval for the visitor being detected is at least less than a predetermined time β.

In summary, techniques of moving object tracking, visitor database management and adaptive threshold learning, etc. are combined in the method for tracking the moving object of the present invention, by which the appearance model is built according to the appearance features of the moving object in a plurality of the images, and is compared to the data stored in the visitor database that is configured in the system memory, so as to keep tracking the moving object. Even if the moving object leaves the monitoring area and returns again, the visitor can still be successfully associated to its former behaviour, so as to assist the supervisor in finding abnormal acts and making following reactions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for tracking a moving object, comprising:
    detecting the moving object in a plurality of continuous images to obtain space information of the moving object in each of the images;
    tracking the moving path of the moving object according to the space information, and accumulating a elapsed time of the moving object staying in the images;
    capturing an appearance feature of the moving object in each of the images to build an appearance model of the moving object if the elapsed time is greater than a first predetermined time;
    associating the appearance model of the moving object to a plurality of appearance models within a database to judge whether the appearance model of the moving object is recorded in the database, the associating comprising:
        calculating a distance between the appearance model of the moving object and each of the appearance models in the database, judging whether the distance is less than a threshold, and renewing the appearance model in the database according to the appearance model of the moving object if the distance of the appearance model is less than the threshold, the calculating comprising:
            calculating a first distance between the appearance models built at two different time points based on the moving object in the images, so as to build a first distance distribution;
            calculating a second distance between the appearance models of two moving objects in the images, so as to build a second distance distribution; and
            obtaining a boundary of the first distance distribution and the second distance distribution to serve as the threshold for distinguishing the appearance model; and
    combining the space information and the appearance model of the moving object to track a moving path of the moving object in the images.

2. The method for tracking a moving object as claimed in claim 1, wherein the step of detecting the moving object in a plurality of continuous images further comprises:
    subtracting a background image from the images to detect the moving object.

3. The method for tracking a moving object as claimed in claim 1, wherein after the step of detecting the moving object in a plurality of continuous images, the method further comprises:
    marking a plurality of connection regions in the images; and
    estimating a minimum rectangular region capable of encircling the connection regions.

4. The method for tracking a moving object as claimed in claim 3, wherein the steps of detecting the moving object in a plurality of continuous images further comprise:
    judging whether the moving object is a tracking object; and
    filtering the moving object not belonged to the tracking object.

5. The method for tracking a moving object as claimed in claim 4, wherein the steps of judging whether the moving object is the tracking object comprise:
    judging whether an area of the rectangular region is greater than a first predetermined value; and
    judging the moving object encircled by the rectangular region to be the tracking object if the area is greater than the first predetermined value.

6. The method for tracking a moving object as claimed in claim 4, wherein the steps of judging whether the moving object is the tracking object comprise:
    judging whether an aspect ratio of the rectangular region is greater than a second predetermined value; and
    judging the moving object encircled by the rectangular region to be the tracking object if the aspect ratio is greater than the second predetermined value.

7. The method for tracking a moving object as claimed in claim 3, wherein the steps of capturing the appearance feature of the moving object in each of the images to build the appearance model of the moving object comprise:
    dividing the rectangular region into a plurality of blocks, and capturing a color distribution of each of the blocks;
    obtaining a median of the color distribution from each of the blocks according to a recursive method to build a binary tree for describing the color distribution; and
    selecting the color distributions of branches of the binary tree to serve as a feature vector of the appearance model of the moving object.

8. The method for tracking a moving object as claimed in claim 1, wherein the moving object is a pedestrian.

9. The method for tracking a moving object as claimed in claim 7, wherein the step of dividing the rectangular region into the blocks comprises dividing the rectangular region into a head block, a body block and a lower limb block according to a proportion of 2:4:4.

10. The method for tracking a moving object as claimed in claim 9, wherein the step of capturing the color distribution of each of the blocks comprises neglecting the color distribution of the head block.

11. The method for tracking a moving object as claimed in claim 10, wherein the color distribution comprises a color feature in a RGB color space or in a hue, saturation, illumination (HSI) color space.

12. The method for tracking a moving object as claimed in claim 10, wherein the steps of combining the space information and the appearance model of the moving object to track the moving path of the moving object in the images comprise:
    calculating a spatial related prior probability of the corresponding moving object in two adjacent images according to the space information;
    calculating a likelihood of the corresponding moving object in the two adjacent ages according to the appearance information; and
    combining the prior probability and the likelihood to a Bayesian tracker to judge the moving path of the moving object in the adjacent images.

13. The method for tracking a moving object as claimed in claim 10, wherein the steps of
    associating the appearance model of the moving object to a plurality of appearance models within the database to judge whether the appearance model of the moving object is recorded in the database comprise:
    only recording the elapsed time of the moving object into the database if the appearance model of the moving object is already recorded in the database; and recording the elapsed time and the appearance model of the moving object into the database if the appearance model of the moving object is not recorded in the database.

14. The method for tracking a moving object as claimed in claim 13, wherein the step of renewing the appearance model in the database according to the appearance model of the moving object comprises:
   selecting one of the appearance models with the distance being less than the threshold and most similar to the appearance model of the moving object to renew the appearance model in the database.

15. The method for tracking a moving object as claimed in claim 13, wherein the steps of building the first distance distribution and the second distance distribution comprise:
   respectively calculating a mean and a standard deviation of the first distance distribution and the second distance distribution; and
   representing data of the first distance distribution and the second distance distribution by a normal distribution according to the mean and the standard deviation, so as to build the first distance distribution and the second distance distribution.

16. The method for tracking a moving object as claimed in claim 10, wherein after the step of recording the elapsed time and the appearance model of the moving object into the database, the method further comprises:
   analysing a time sequence of the moving object in the database to determine whether the moving object is accorded to a wander event.

17. The method for tracking a moving object as claimed in claim 16, wherein the steps of analysing the time sequence of the moving object in the database to determine whether the moving object is accorded to a wander event comprise:
   judging whether a time for the moving object continuously appearing in the images is greater than a second predetermined time; and
   judging the moving object to be accorded to the wander event if the time for the moving object continuously appearing in the images is greater than the second predetermined time.

18. The method for tracking a moving object as claimed in claim 16, wherein the steps of analysing the time sequence of the moving object in the database to determine whether the moving object is accorded to a wander event comprise:
   judging whether a time interval for the moving object leaving the images is less than a third predetermined time; and
   judging the moving object to be accorded to the wander event if the time interval for the moving object leaving the images is less than the third predetermined time.

* * * * *